UNITED STATES PATENT OFFICE 1,939,189

PRODUCTION OF DIOXANE AND ITS HOMOLOGUES

Gerhard Steimmig and Otto Hambsch, Ludwigshafen-on-the-Rhine, Germany, assignors to I. G. Farbenindustrie Aktiengesellschaft, Frankfort-on-the-Main, Germany, a corporation of Germany No Drawing. Application September 19, 1928, Serial No. 307,046, and in Germany December 27, 1927

2 Claims. (Cl. 260—54)

The present invention relates to the production of dioxane

and its homologues.

We have found that mixtures comprising dioxane and its homologues can be easily obtained by treating the mixtures of glycols which can be obtained by conversion of the olefines contained in gases evolved in a cracking operation of hydrocarbons, mineral oils, tars and the like, which glycols may also be employed in the form of mixtures of polyglycols or ethers thereof obtainable as by-products in the production of glycols, or, respectively of ethers of the latter with catalytic substances of dehydrating action. The said mixtures of polyglycols consist mainly of ethers of the most varied kind of homologues of glycol, the composition varying in each case in accordance with the initial materials employed. For the sake of brevity the aforesaid polyglycols and ethers thereof will be referred to in the following and in the claims as glycolic bodies. Catalytic substances suitable for the said purpose are for example sulfuric acid, phosphoric acid, zinc chlorid, sodium- or potassium bisulphate, aromatic sulfonic acids and the like.

The process can be performed for example by producing a mixture of polyhydric alcohols consisting of about 60 per cent of ethylene glycol, about 32 per cent of 1.2-propylene glycol and about 8 per cent of 1.2-butylene glycol from a gaseous mixture obtained as a by-product in cracking a brown coal tar oil and consisting of 30 per cent of ethylene, 14 per cent of propylene, 3 per cent of butylene and 53 per cent of other gases and vapors such as carbon dioxid, carbon monoxid, hydrogen, nitrogen and lower aliphatic hydrocarbons.

When acting with one or more of the aforesaid catalysts upon the said mixture of glycols at about the boiling point of the mixture of glycols, a mixture consisting of about 60 per cent of dioxane, 34 per cent of dimethyl dioxane and 6 per cent of diethyl dioxane is obtained in a very good yield which mixture distils between about 95° and 150° C. Instead of employing as initial material a mixture containing various homologues of glycol of the aforesaid kind, the higher homologues of ethylene glycol can be previously separated or prepared in another manner and can be converted singly into the corresponding homologues of dioxane. Thus for example dimethyl dioxane with a boiling point of 115° to 117° C. (at 745 millimeters mercury gauge) can be obtained from 1.2 propyleneglycol and diethyl dioxane with a boiling point of 150° to 155° C. (at 751 millimeters mercury gauge) from 1.2-butyleneglycol. The homologues of dioxane are valuable solvents for different organic compounds and especially for nitrocellulose, and they are superior to dioxane itself for several reasons. Thus, for example, the viscosity of a solution of nitrocellulose in a homologue of dioxane is lower than that of a solution in dioxane, a solution of a certain nitrocellulose in dimethyl dioxane showing a viscosity of almost one half of that in dioxane and a solution of the same nitrocellulose in diethyl dioxane showing almost one third of the viscosity of the solution in dioxane (measured in a viscosimeter according to Cochius of 7 millimeters diameter at 20° C.). Consequently, the same quantities of nitrocellulose can be dissolved in lower quantities of the homologues of dioxane than are necessary, for obtaining the same viscosity, of dioxane itself. Moreover, nitrocellulose solutions in the homologues can be more easily adulterated with ethyl alcohol, the solutions in the homologues being adulterable with up to 75% alcohol. Besides this, the homologues of dioxane are very difficultly soluble in water, so that solutions of nitrocellulose or of other coating agents therein are less attacked by water. Another advantage involved by the homologues consists in that acetyl cellulose is not dissolved in the higher homologues of dioxane in contrast to dioxane itself, so that a coating of a nitrocellulose lacquer containing homologues of dioxane can be easily applied onto a coating of acetyl cellulose without attacking the latter.

The following examples will further illustrate, how the invention may be carried out in practice, but the invention is not limited thereto. The parts are by weight.

Example 1

A mixture of 25 parts of a mixture of glycols obtained from the mixture of olefines evolved in a cracking operation and 1 part of concentrated sulfuric acid is heated in an acid resisting distilling vessel to boiling, further amounts of the mixture of the glycols being added in an amount corresponding to that of the mixture of dioxane and its homologues distilling off. The yield of commercially pure mixture of dioxanes with a boiling point of from about 95° to 150° C. amounts to about 80 per cent of the theoretical yield.

Example 2

25 parts of the mixture of glycols described in the foregoing example are heated to boiling in an acid resisting distilling vessel together with 2 parts of sodium bisulphate whereby further amounts of the mixture of glycols are added in the same quantities, as the mixture of dioxanes distills off. The yield is about the same as stated in the foregoing example.

Example 3

A mixture of 25 parts of 1.2-propylene glycol and 1 part of concentrated sulfuric acid is treated as described in Example 1. Dimethyl dioxane is obtained in about 80 per cent of the theoretical amount. By treating 1.2-butylene glycol in the same manner an equivalent yield of diethyl dioxane is obtained.

What we claim is:

1. The process for the production of mixtures of dioxane and its homologues which comprises acting with sulfuric acid upon a mixture of homologous 1.2 glycols, obtainable from the mixture of olefines evolved in an operation of cracking organic materials, at the boiling point of the mixture, further initial material being added in an amount corresponding to that of the mixture of dioxane and its homologues distilling off.

2. A mixture of dioxane and its homologues distilling from about 95° to about 150° C.

GERHARD STEIMMIG.
OTTO HAMBSCH.